US010637335B2

(12) United States Patent
Gressier et al.

(10) Patent No.: US 10,637,335 B2
(45) Date of Patent: Apr. 28, 2020

(54) METHOD FOR PRODUCING WOUND STATOR OF ROTARY ELECTRICAL MACHINE

(71) Applicant: VALEO EQUIPEMENTS ELECTRIQUES MOTEUR, Creteil (FR)

(72) Inventors: Samuel Gressier, Cucq (FR); Olivier Luittre, Beaumerie Saint Martin (FR); Ngoc-Toan Vo, Sorrus (FR); Guylain Hurtrelle, Berck (FR); Olivier Lefrancois, Etaples (FR); Sébastien Paindavoine, Estréelles (FR)

(73) Assignee: Valeo Equipment Electriques Moteur, Creteil (FR)

( * ) Notice: Subject to any disclaimer, the term of this patent is extended or adjusted under 35 U.S.C. 154(b) by 371 days.

(21) Appl. No.: 15/325,676

(22) PCT Filed: Jul. 9, 2015

(86) PCT No.: PCT/FR2015/051905
§ 371 (c)(1),
(2) Date: Jan. 11, 2017

(87) PCT Pub. No.: WO2016/009137
PCT Pub. Date: Jan. 21, 2016

(65) Prior Publication Data
US 2017/0170711 A1 Jun. 15, 2017

(30) Foreign Application Priority Data
Jul. 15, 2014 (FR) ..................................... 14 56774

(51) Int. Cl.
*H02K 15/00* (2006.01)
*H02K 15/02* (2006.01)
(Continued)

(52) U.S. Cl.
CPC .......... *H02K 15/026* (2013.01); *H02K 1/146* (2013.01); *H02K 15/0037* (2013.01);
(Continued)

(58) Field of Classification Search
CPC ...... H02K 15/026; H02K 1/146; H02K 15/08; H02K 15/068; H02K 15/0037;
(Continued)

(56) References Cited

U.S. PATENT DOCUMENTS 3,447,225 A * 6/1969 Eminger .............. H02K 15/068
29/564.7
4,290,190 A 9/1981 Arnold
(Continued)

FOREIGN PATENT DOCUMENTS

EP 0803962 A1 10/1997
EP 0831580 A2 3/1998
(Continued)

OTHER PUBLICATIONS

FR2867629A1_ Translated (Year: 2005).*

*Primary Examiner* — Thiem D Phan
(74) *Attorney, Agent, or Firm* — Berenato & White, LLC

(57) ABSTRACT

The invention relates mainly to a method for producing a wound stator (1), including: a step of preparing a phase winding; an insertion step which includes inserting the phase winding into a corresponding series of notches (5) in said stator (1); and an intermediate step of forming lead out wires of the winding (26) each extending between two notches (5) of each series of the inserted phase windings, by applying a first radial force (F1) from an axis (X) of the stator (1) toward the outside of the stator (1), wherein the method also comprises a step of positioning a bearing surface facing at least one notch (5) such as to apply a second radial force (F2)
(Continued)

resulting from the application of the first force (F1) from the outside toward the axis (X) of the stator (1).

2 Claims, 4 Drawing Sheets

(51) Int. Cl.
    *H02K 15/06*     (2006.01)
    *H02K 1/14*     (2006.01)
    *H02K 15/08*     (2006.01)

(52) U.S. Cl.
    CPC .......... *H02K 15/068* (2013.01); *H02K 15/08* (2013.01); *Y10T 29/49009* (2015.01)

(58) Field of Classification Search
    CPC .. H02K 15/065–068; H02K 5/04; H02K 5/08; Y10T 29/49009; Y10T 29/53143; Y10T 29/49012; Y10T 29/49826
    USPC ........ 29/596, 33 L, 428, 592, 598, 609, 732, 29/750

See application file for complete search history.

(56) References Cited

U.S. PATENT DOCUMENTS 6,223,784 B1 *   5/2001   Kirschner .......... H02K 15/0485
                                                   140/92.2
8,181,332 B2 *   5/2012   Chochoy .................. H02K 3/12
                                                       29/596

FOREIGN PATENT DOCUMENTS

| FR | 2846481 A1 | | 4/2004 | |
|---|---|---|---|---|
| FR | 2867629 A1 | * | 9/2005 | ............... H02K 3/12 |
| FR | 2886483 A1 | | 12/2006 | |
| JP | S60144130 A | | 7/1985 | |

* cited by examiner

METHOD FOR PRODUCING WOUND STATOR OF ROTARY ELECTRICAL MACHINE

CROSS-REFERENCE TO RELATED APPLICATIONS AND CLAIM TO PRIORITY

This application is a national stage application of International Application No. PCT/FR2015/051905 filed Jul. 9, 2015, which claims priority to French Patent Application No. 1456774 filed Jul. 15, 2014, the disclosures of which are incorporated herein by reference and to which priority is claimed.

FIELD OF THE INVENTION

The invention relates to a method for producing a wound stator of a rotary electrical machine, as well as to the corresponding wound stator. The invention has a particularly advantageous application for winding of a stator of a rotary electrical machine, such as, for example, an alternator, an alternator-starter, or a starter of a motor vehicle.

BACKGROUND OF THE INVENTION

In a known manner, rotary electrical machines comprise a stator and a rotor which is integral with a shaft. The rotor can be integral with a driving and/or driven shaft, and can belong to a rotary electrical machine in the form of an alternator, as described in document EP0803962, or an electrical machine as described in document EP0831580. The electrical machine comprises a housing which supports the stator. This housing is configured to rotate the rotor shaft, for example by means of bearings.

The rotor comprises a body formed by a stack of metal sheets maintained in the form of a set by means of an appropriate securing system, such as rivets which pass through the rotor axially from one side to the other. The rotor comprises poles which are formed for example by permanent magnets accommodated in cavities provided in the magnetic mass of the rotor, as described for example in document EP0803962. Alternatively, in a so-called "projecting" poles architecture, the poles are formed by coils wound around arms of the rotor.

The stator comprises a ferromagnetic body constituted by a stack of thin plates, as well as a winding received in notches in the stator which are open towards the interior. The winding is formed by a plurality of phase windings each corresponding to a phase of the machine. Each winding is formed by a series of turns each formed by one or a plurality of continuous wires which are generally made of copper. These wires follow an undulating form, and have loop structures situated alternately on each side of the stator, connecting to one another segment structures situated inside notches. A series of loop structures extending from one side of the stator constitutes a chignon of the winding.

The winding of the stator is conventionally produced phase by phase. For example, for a hexaphase machine, the six phase windings are produced in the same manner one after the other. Closure wedges are inserted in the notches during the production of each phase winding.

The disadvantage of this type of winding is that the chignons of the first phase winding impede the insertion of the winding of the following phase, and so on, the final phase being obstructed by the chignons of all the preceding phase windings.

In order to solve this problem, an intermediate forming operation is carried out, consisting of clearing the space above and below the notches of the following phase to be inserted, by application in the chignons of a radial force going from the interior towards the exterior of the stator. This force is applied by means of clamping jaws which act simultaneously and identically on all the lower and upper parts of the chignons of the winding.

However, the force which is transmitted by the clamping jaws on the wires of the chignons induces a force in the notches which tends to eject the notch closure wedges, or the wires, in the case when the method does not involve the use of closure wedges. The radial expansion of the clamping jaws is thus limited by this phenomenon, which therefore does not make it possible to clear enough space in the notches of the stator for the purpose of inserting the following phase windings.

The consequence is that the notches are not filled in an optimum manner, such that the coefficient of filling of the notches (i.e. the ratio between the cross-section of the bare conductive wire, and the complete cross-section of the notch), and thus the performance of the machine, are downgraded. In fact, the known methods make it possible to produce wound stators with a maximum filling level of 52% for three-phase applications and 50% for hexaphase applications.

SUMMARY OF THE INVENTION

The objective of the invention is to eliminate these disadvantages efficiently by proposing a method for producing a wound stator comprising:
  a step of preparation of a phase winding;
  an insertion step, comprising insertion of the said phase winding in a corresponding series of notches in the said stator; and
  an intermediate step of forming winding chignons each extending between two consecutive notches of each series of inserted phase windings, by application of a first radial force going from an axis of the said stator towards the exterior of the said stator, characterised in that it additionally comprises a step of positioning of a support surface opposite at least one notch, such as to oppose a second radial force resulting from the application of the first force going from the exterior towards the axis of the said stator.

Thus, because of the retention of the wires inside the notches, it is possible to increase the first force applied during the intermediate forming step, which makes it possible to clear better the notches of the following phases to be inserted. The invention thus makes it possible to increase substantially the filling level, which can reach more than 55% for hexaphase applications.

According to one embodiment, the insertion step additionally comprises insertion of closure wedges in the series of notches corresponding to the phase winding inserted, and in this case the said support surface is placed against at least one of the said closure wedges during the intermediate forming step.

According to one embodiment, the said first radial force is applied on some of the said winding chignons, such as to clear at least the series of notches corresponding to the following phase winding to be inserted. For this purpose, the radial force going from an axis of the said stator towards the exterior of the said stator is applied according to a radius aligned with at least one notch of the series of notches of the following phase winding to be inserted.

According to one embodiment, the said first radial force is applied on some of the said winding chignons such as to clear firstly the series of notches corresponding to the final phase winding to be inserted, then the series of notches corresponding to the following phase winding to be inserted. For this purpose, the radial force going from an axis of the said stator towards the exterior of the said stator is applied firstly according to a radius aligned with at least one notch of the series of notches corresponding to the final phase winding to be inserted, then according to a radius aligned with at least one notch of the series of notches of the following phase winding to be inserted.

According to one embodiment, with the said winding chignons comprising a first, lower part situated on the side of one of the two axial ends of the stator, and a second, upper part situated on the side of the other axial end of the said stator, the said first radial force is applied on each of the two parts by means of clamping jaws, between a starting position and an arrival position, in which the radial distances of the clamping jaws relative to the axis on the lower part side and on the upper part side are different.

According to one embodiment, with the said insertion step comprising a step of pivoting from a horizontal position to a vertical position of the said phase winding by means of a pivoting ring situated on a side of one of the two axial ends of the stator, the said arrival position is closer to the axis on the side of the said pivoting ring.

According to one embodiment, since the insertion of the said closure wedges is carried out from a first axial end of the stator towards a second axial end of the stator, the said arrival position is further from the said axis on the side of the said second end of the stator. This makes it possible to facilitate the insertion of the closure wedges.

According to one embodiment, during the positioning of a plurality of support surfaces, teeth of the said stator which delimit the said notches are positioned inside receptacles with a complementary form extending between two successive support surfaces.

According to one embodiment, the positioning of the said teeth inside the said receptacles is such that the support surfaces obstruct substantially completely the space of the notch over a diameter corresponding to approximately an inner diameter of the stator to which twice a third of a notch depth is added.

According to one embodiment, before the insertion of the phase winding, the said method comprises a step of putting radial fingers into place above at least one axial end face of teeth of the said stator.

According to one embodiment, the said radial fingers are positioned such as to come into contact against a connection face which extends between two successive support surfaces.

According to one embodiment, the preparation step consists of preparing two half phase windings comprising a superimposition of identical flat turns in the form of a star.

According to one embodiment, the turns of the half windings are offset angularly relative to one another, such as to obtain a distributed undulating winding.

According to one embodiment, the said half phase windings are inserted at the same time in a series of notches by progressive torsion of the turns, such as to carry out pivoting of the phase winding from a horizontal position to a vertical position.

According to one embodiment, the said method comprises the step of carrying out in succession insertion of a first, a second, and a third phase winding of a first three-phase system, then insertion of a first, a second, and a third phase winding of a second three-phase system, such that the insertions are carried out in succession in one series of notches out of two. This therefore limits the torsion on the winding wires during the successive insertions.

According to one embodiment, the said method comprises a step of forming of the winding chignons.

The invention also relates to the wound stator of a rotary electrical machine obtained by means of the method as previously defined.

BRIEF DESCRIPTION OF THE DRAWINGS

The invention will be better understood by reading the following description and examining the figures which accompany it. These figures are provided purely by way of non-limiting illustration of the invention.

Elements which are identical, similar or analogous retain the same reference from one figure to another.

DETAILED DESCRIPTION OF THE PREFERRED EMBODIMENT(S)

Figure 1:
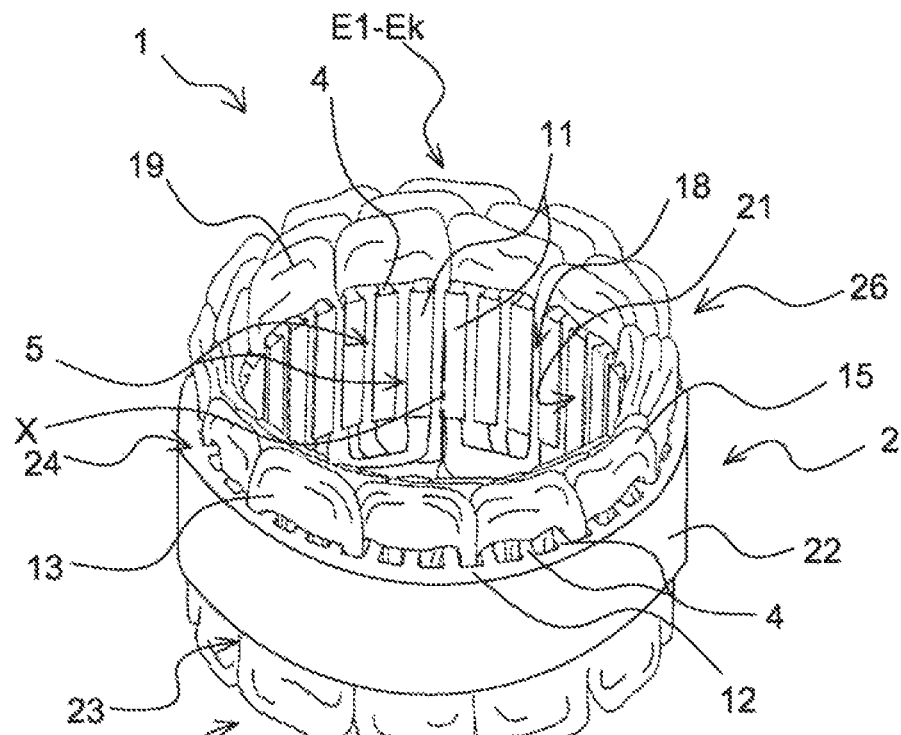
FIG. 1 is a view in perspective of a wound stator obtained further to implementation of the method according to the present invention.

FIG. 1 shows a view in perspective of a wound stator 1 of a rotary electrical machine, which can be for example an alternator or an alternator-starter. This machine is preferably designed to be implemented in a motor vehicle. It will be remembered that an alternator-starter is a rotary electrical machine which can work reversibly, firstly as an electric generator in alternator function, and secondly as an electric motor, in particular in order to start or restart the thermal engine of the motor vehicle in a so-called stop and start functioning mode (i.e. the mode for stopping and restarting the engine according to the traffic conditions).

This stator 1 comprises a body 2 with an annular cylindrical form with an axis X, consisting of an axial stack of flat plates each having a small thickness. The body 2 is delimited radially by an inner cylindrical face 21 and by an outer cylindrical face 22. The body 2 is delimited axially by a lower end face 23 and by an upper end face 24.

The body 2 comprises on its circumference teeth 4 which delimit notches 5 in pairs, two consecutive notches 5 thus being separated by a tooth 4. The notches 5 open axially into the axial end faces 23, 24 of the body 2. The notches 5 are open radially in the inner face 21 of the body 2. The notches 5, which are all substantially identical, are distributed angularly regularly around the axis X. There are for example 36, 48, 60, 72, 84 or 98 notches 5. In this embodiment, the stator 1 comprises 36 notches.

Figure 4:
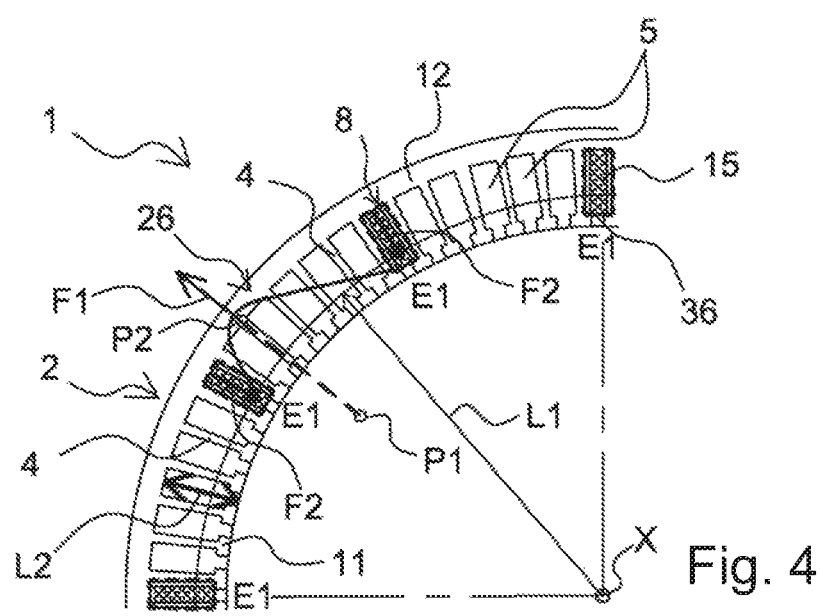
FIG. 4 is a view in partial cross-section of the stator during the step of intermediate forming of the chignons of the winding further to the insertion of a first phase winding.

Insulators 8 which can be seen in FIG. 4 are preferably arranged in the notches 5 before carrying out the insertion of the winding, in order to avoid damaging the conductors during this delicate operation, and to insulate the conductors electrically against the body 2.

In order to improve the magnetic performance of the machine, each tooth 4 preferably comprises a tooth root 11 which extends circumferentially on both sides of the free end of each tooth 4. The solid part 12 of the stator 1 which extends between the base of the notches 5 and the outer periphery 22 is known as the head.

Phase windings E1-Ek each corresponding to one of the phases of the electrical machine are inserted in the notches 5. Each phase winding E1-Ek is constituted by undulating turns 13 stacked radially. These turns 13 are formed by electrical conductors each comprising one or a plurality of wires 15. The wires 15, which are generally made of copper, are covered with a layer of enamel for their insulation. These wires 15 preferably have a round cross-section. As a variant, the wires 15 could have a cross-section which is square, rectangular, or in the form of a flattened part.

In a given phase winding E1-Ek, each turn 13 comprises a series of segment structures 18 which are received in an associated series of notches 5. Each turn 13 also comprises loop structures 19 which connect the consecutive segment structures 18, and extend projecting alternately on both sides of the axial end faces 23, 24. The winding chignons 26 correspond to the loop structures 19 which extend between two notches 5 of each series of the phase windings E1-Ek. The chignons 26 comprise an upper part which is situated on the side of the upper end face 24, and a lower part which is situated on the side of the lower end face 23, i.e., the winding chignons 26 are formed axially outside the body 2 of the stator 1.

Two consecutive notches 5 of a given series of notches are separated by adjacent notches 5 each corresponding to another series of notches 5 associated with one of the other phase windings. In other words, for a stator 1 comprising k phase windings E1-Ek, the wires 15 of a phase winding E1-Ek are received in one notch 5 out of k adjacent notches. Thus, for a stator 1 of a three-phase machine, two adjacent notches are left free between two notches 5 of each series. In other words, the wires 15 of a phase winding E1-Ek are inserted in one notch out of three adjacent notches. In general, the machine can comprise three to seven phases.

Figure 2:
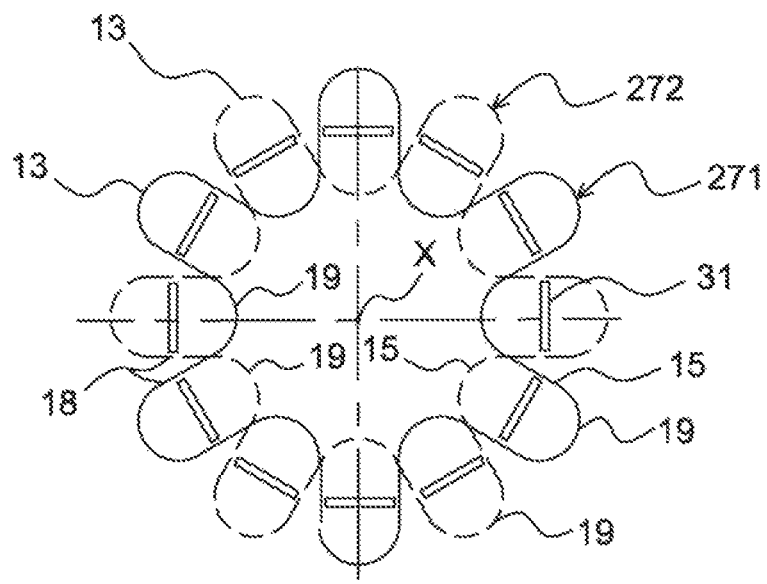
FIG. 2 is a view from above of the half phase windings positioned around blades of an insertion tool used with the method according to the present invention.

A description is given hereinafter of the method for producing the wound stator 1 according to the present invention, based on the successive insertion of the phase windings E1-Ek. More specifically, the method comprises a step of preparation of a phase winding E1-Ek from a wire 15. This phase winding E1-Ek comprises two, upper 271 and lower 272 half phase windings represented in FIGS. 2 and 3.

Each half winding 271, 272 comprises a superimposition of identical flat turns 13 in the form of a star, each having a plurality of loop structures 19 connecting to one another the segment structures 18 with substantially radial orientation which are designed to be inserted in the notches 5.

The turns 13 of a single half winding 271, 272 are superimposed on one another. The upper half winding 271 is placed above the lower half winding 272, the axes of symmetry of the two half windings 271, 272 being aligned and substantially combined with the axis X of the stator 1.

The turns 13 of the upper half winding 271 are also offset angularly relative to the turns 13 of the lower half winding 272, such that each loop structure 19 of one of the half windings 271, which is designed to extend from one of the sides of the stator, is interposed angularly between two loop structures 19 of the other half winding 272, which are designed to extend on the same side of the stator. This therefore provides a distributed undulating winding.

Figure 3:
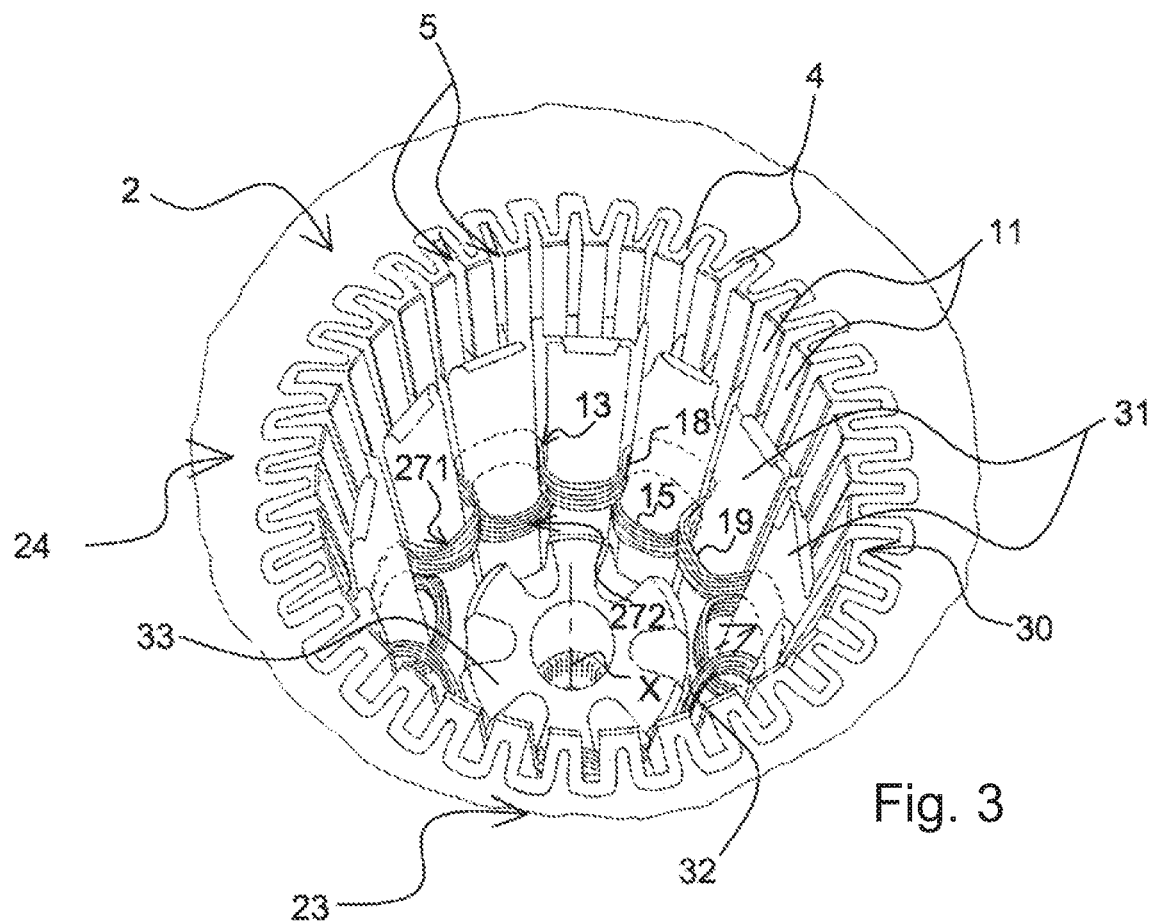
FIG. 3 is a view in perspective of the inside of the stator body and of the insertion tool.

The method then comprises a step of insertion of the two half windings 271, 272 of a phase in the corresponding series of notches 5. For this purpose, as can be seen in FIG. 3, an insertion tool 30, to which the half windings 271, 272 have been transferred, is positioned on the side of the lower end face 23 of the body 2, with the turns 13 in the form of a star being centred on the axis X of the body 2, and extending on planes substantially perpendicular to this axis.

The half windings 271, 272 are then inserted at the same time in the notches 5 of the corresponding series, by progressive torsion of the turns 13, such as to provide pivoting of the phase winding E1-Ek from a horizontal position to a vertical position, in which the said turns 13 are oriented in a direction parallel to the axis X.

More specifically, the insertion tool 30 comprises blades 31 which are positioned according to a circle centred on the axis X, each associated with a counter-blade 32 situated behind the blade 31, as well as a pivoting ring 33 which is situated on the side of the lower axial end 23.

The insertion of the half windings 271, 272 is carried out by displacing the pivoting ring 33 upwards, such as to push the turns 13 into the notches 5 by torsion, until the turns 13 fill the notches 5 along their entire length. In parallel, the blades 31 which are displaced in the same direction as the ring 33 slide on the inner cylindrical face 21 of the body 2, such as to act as a guide for the segment structures 18, whereas counter-blades 32 ensure guiding of the blades 31 during their movement.

In addition, closure wedges 36 which are represented in FIG. 4 are inserted in each notch 5 of the series corresponding to the phase winding E1-Ek inserted. The insertion of the wedges 36 is carried out by going from the lower axial end 23 to the upper axial end 24 of the stator.

Figure 5:
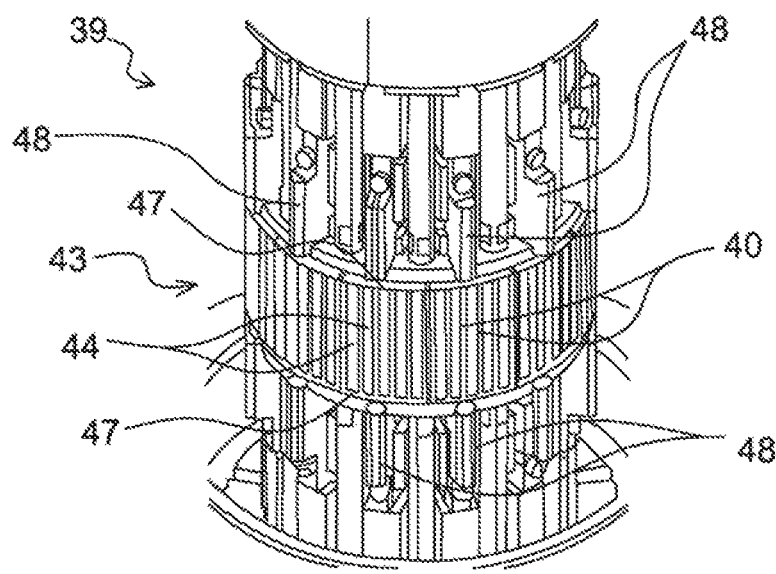
FIG. 5 shows a view in perspective of an intermediate forming tool use during the implementation of the winding method according to the present invention.

The stator 1 is then positioned around an intermediate forming tool 39 shown in FIG. 5, such that support surfaces 40 situated on a circumference of the central part 43 of the tool are placed radially against the closure wedges 36. These support surfaces 40 extend according to the entire height of the notches 5, between the two axial end faces 23, 24 of the stator 1, such as to close the notches 5.

Figure 6:
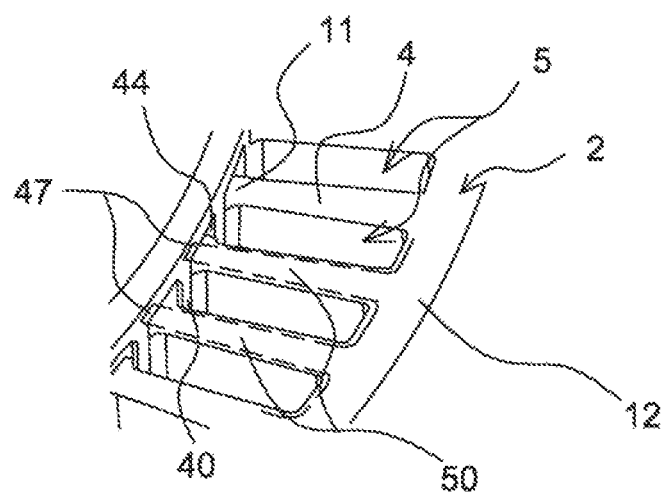
FIG. 6 is a detailed view in perspective of the support surfaces of the intermediate forming tool in FIG. 5 positioned opposite notches without the closure wedges or the winding wires.

In this case, as can be seen clearly in FIG. 6, the teeth 4 of the stator 1 are positioned inside receptacles 44 with a complementary form which extend between two successive support surfaces 40. Preferably, the positioning is such that the support surfaces 40 obstruct substantially completely the space of the notches 5 contained between the lower 23 and upper 24 end faces of the stator, over a diameter L1 corresponding approximately to an inner diameter of the body 2, to which there is added twice a third of the depth L2 of a notch measured according to a radial direction.

The support surfaces 40 are connected together via their axial ends by connection faces 47 which extend on the side of the upper 24 and lower 23 end faces of the body 2.

An intermediate forming step is then carried out on the winding chignons 26. For this purpose, the tool 39 comprises a first series of lower clamping jaws 48, which are distributed according to a circle, and situated below the central part 43, as well as a second series of upper clamping jaws 48, which are distributed according to a circle, and situated above the central part 43.

These clamping jaws 48 are designed to apply a first radial force F1 on the chignons 26, going from the axis X of the stator 1 towards the exterior of the stator 1. This first radial force F1 is applied by the first and second series of clamping jaws 48 respectively on the lower part and the upper part of the chignons 26, such as to clear at least the series of notches 5 corresponding to the following phase winding to be inserted. As best shown in FIG. 5, the clamping jaws 48 forming the winding chignons 26 are disposed outside of the support surface 40. Preferably, the clamping jaws 48 are activated such as to clear firstly the notches 5 of the series corresponding to the final phase winding E1-Ek to be inserted, then the notches 5 of the series corresponding to the following phase winding E1-Ek to be inserted.

It will be noted that, during the intermediate forming step, the support surfaces 40 situated opposite the notches 5 make it possible to oppose the second radial force F2 derived from the application of the first force F1, and going from the exterior towards the axis X of the stator 1. This therefore prevents the wires 15 from exerting in the notches 5 a force liable to eject the closure wedges 36 of the phases previously inserted. In addition, because of the retention of the wedges 36, it is possible to increase the force applied by the clamping jaws 48, which makes it possible to clear the notches 5 better for insertion of the following phase winding.

The clamping jaws 48 are displaced between a starting position P1 and an arrival position P2 (cf. FIG. 4). Preferably, the radial distances which separate the arrival positions of the clamping jaws 48 relative to the axis X of the side of the lower face 23 and of the side of the upper face 24 of the stator 1 are different. In this case, the arrival position P2 is closer to the axis X of the side of the pivoting ring 33. The arrival position P2 of the clamping jaws 48 is then further relative to the axis X of the side of the upper end face 24, i.e. the side opposite that via which the closure wedges 36 are inserted. This makes it possible to facilitate the insertion of the wedges 36 for the following phase winding E1-Ek to be inserted.

The stator 1 is then indexed in the insertion position of the following phase winding E1-Ek to be inserted. The operations are carried out n−1 times, n being the number of phases to be inserted. Thus, the operations are carried out five times for the hexaphase applications (1 to 2, 2 to 3, 3 to 4, 4 to 5, and 5 to 6), or twice for the three-phase applications (1 to 2, and 2 to 3).

Figure 7:
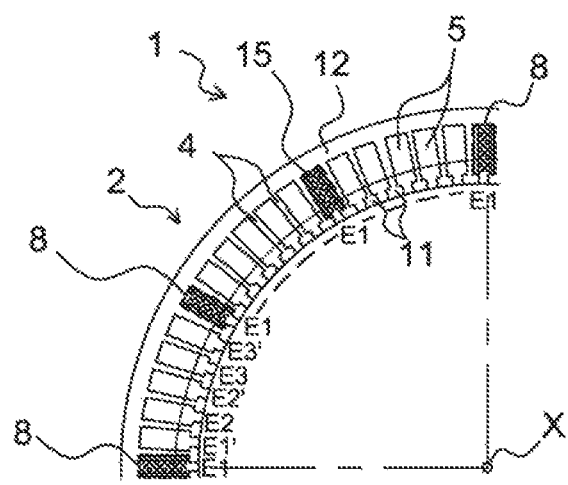
FIG. 7 is a view in partial cross-section of a stator according to the present invention showing the order of the phases of a double three-phase system obtained by means of the method according to the present invention.

Preferably, a stator 1 with six phases of the double three-phase type is taken into consideration, comprising, as shown in FIG. 7, series of notches 5 corresponding successively to the first phase winding E1 of a first three-phase system, to the first phase winding E1' of a second three-phase system, to the second phase winding E2 of the first three-phase system, to the second phase winding E2' of the second three-phase system, to the third phase winding E3 of the first three-phase system, and to the third phase winding E3' of the second three-phase system. In this case, the insertions are carried out in succession of the first E1, the second E2, and the third E3 phase windings of the first three-phase system, then the insertions of the first E1', the second E2', and the third E3' phase windings of the second three-phase system. In other words, the insertions are carried out in one series of notches 5 out of two, in order to limit the torsion on the wires 15 of the winding. It will be appreciated that the above-described intermediate forming steps are carried out between each insertion.

At the end of the insertion of the phase windings E1-Ek, an independent machine carries out a step of forming of the upper and lower parts of the chignons 26, according to a dimension of the chignons to be obtained. A dimension of this type depends on the application envisaged.

Preferably, before the insertion of the phase windings E1-Ek, the method comprises a step of putting radial fingers 50 into place above axial end faces of the teeth 4 of the stator 1. As can be seen in FIG. 6, the fingers 50 are positioned such as to come into contact against a connection face 47 which extends between two support surfaces 40. This therefore limits the risk of the chignons 26 being able to slide along the conventionally shorter fingers 50, and come into contact with the plates of the body 2, which plates have flash liable to damage the wires 15. This therefore prevents the conductive wires 15 from coming into contact with the body 3 of the stator 1 during operations of insertion of the phase windings E1-E6.

As a variant, it is possible to produce a stator 1 which does not comprise closure wedges 36, with the support surfaces 40 then being positioned opposite the notches 5, in order to prevent wires 15 from coming out during the intermediate forming operations.

It will be appreciated that the preceding description has been provided only by way of example, and does not limit the field of the invention, a departure from which would not be constituted by replacing the details of execution by any other equivalents.

The invention claimed is:

1. A method for producing a wound stator (1), comprising the steps of:
   preparing one of phase windings (E1-Ek),
   inserting only one of the phase windings (E1-Ek) in a corresponding series of notches (5) in a cylindrical body (2) of the stator (1), and
   forming winding chignons (26) axially outside the body (2) of the stator (1), each of the winding chignons (26) extending between two consecutive notches (5) receiving the inserted phase winding (E1-Ek) by application of a first radial force (F1) on the winding chignons (26), the first radial force (F1) acting from an axis (X) of the stator (1) towards an exterior of the stator (1),
   wherein the step of forming winding chignons (26) includes a step of positioning a support surface (40) of a forming tool radially opposite at least one notch (5), such as to oppose a second radial force (F2) resulting from the application of the first force (F1) and going from the exterior of the stator (1) towards the axis (X) of the stator (1),
   wherein the winding chignons (26) are formed outside of the support surface (40),
   wherein, with the winding chignons (26) comprise a first part situated on a side of one of two axial end faces (23) of the stator, and a second part situated on the side of the other axial end face (24) of the stator (1),
   wherein the first radial force (F1) is applied on each of the first and second parts of the winding chignons (26) by means of clamping jaws (48), between a starting position (P1) and an arrival position (P2), in which radial distances of the clamping jaws (48) relative to the axis (X) on the first part side and on the second part side are different,
   wherein, with the insertion step comprises a step of pivoting from a horizontal position to a vertical position of the phase winding (E1-Ek) by means of a pivoting ring (33) situated on a side of one of the two axial end faces of the stator, and wherein the arrival position (P2) is closer to the axis (X) on the side of the pivoting ring (33).

2. A method for producing a wound stator (1), comprising the steps of:
  preparing one of phase windings (E1-Ek),
  inserting only one of the phase windings (E1-Ek) in a corresponding series of notches (5) in a cylindrical body (2) of the stator (1), and
  forming winding chignons (26) axially outside the body (2) of the stator (1), each of the winding chignons (26) extending between two consecutive notches (5) receiving the inserted phase winding (E1-Ek) by application of a first radial force (F1) on the winding chignons (26), the first radial force (F1) acting from an axis (X) of the stator (1) towards an exterior of the stator (1),
  wherein the step of forming winding chignons (26) includes a step of positioning a support surface (40) of a forming tool radially opposite at least one notch (5), such as to oppose a second radial force (F2) resulting from the application of the first force (F1) and going from the exterior of the stator (1) towards the axis (X) of the stator (1),
  wherein the winding chignons (26) are formed outside of the support surface (40),
  wherein the preparation step consists of preparing two half phase windings (271, 272) comprising a superimposition of identical flat turns (13) in the form of a star, and
  wherein the half phase windings (271, 271) are inserted at the same time in a series of notches (5) by progressive torsion of the turns (13), such as to carry out pivoting of the phase winding (E1-Ek) from a horizontal position to a vertical position.

* * * * *